United States Patent [19]
Berger et al.

[11] Patent Number: 5,954,224
[45] Date of Patent: Sep. 21, 1999

[54] INJECTION STRETCH BLOW MOLDED TUBULAR CONTAINERS

[75] Inventors: Kenneth R. Berger, Flemington; Patrick A. Connan, Lebanon; Robert L. Readdy, Hopatcong, all of N.J.

[73] Assignee: Colgate-Palmolive Company, New York, N.Y.

[21] Appl. No.: 08/742,725

[22] Filed: Nov. 1, 1996

[51] Int. Cl.$^6$ .................................................. B65D 23/02
[52] U.S. Cl. ........................... 220/666; 220/667; 215/382
[58] Field of Search .................... 220/660, 666, 220/667; 215/382, DIG. 6

[56] References Cited

U.S. PATENT DOCUMENTS

| | | | |
|---|---|---|---|
| 21,835 | 10/1858 | Johnson | 220/660 |
| 2,781,551 | 2/1957 | Richerod | 220/660 |
| 3,632,713 | 1/1972 | Seefluth . | |
| 3,742,995 | 7/1973 | Confer et al. | 220/666 |
| 3,940,001 | 2/1976 | Haefner et al. | 220/460 |
| 4,313,905 | 2/1982 | Hafele . | |
| 5,232,108 | 8/1993 | Nakamura . | |

FOREIGN PATENT DOCUMENTS

| | | |
|---|---|---|
| 0 677 374 A2 | 10/1995 | European Pat. Off. . |
| 0 703 153 A2 | 3/1996 | European Pat. Off. . |
| 2 476 536 | 8/1981 | France . |
| 55-73518 | 6/1955 | Japan . |
| 61-134224 | 6/1986 | Japan . |
| 63-11324 | 1/1988 | Japan . |
| 2 145 027 | 3/1985 | United Kingdom . |

*Primary Examiner*—Joseph Moy
*Attorney, Agent, or Firm*—Michael J. McGreal

[57] ABSTRACT

Tubular containers can be produced by injection stretch blowmolding processes. Such processes comprise the biaxial stretching of the preform as the preform is being converted into the tubular container. The preform will be stretched longitudinally by means of a stretch rod and laterally by means of the pressure of the blowing gas. The tubular containers produced by these processes will have burst strengths three to five times that of other tubular containers and can be produced in a thin wall collapsible form. Further, the tubular containers can be single chamber containers or multi-chamber containers.

15 Claims, 1 Drawing Sheet

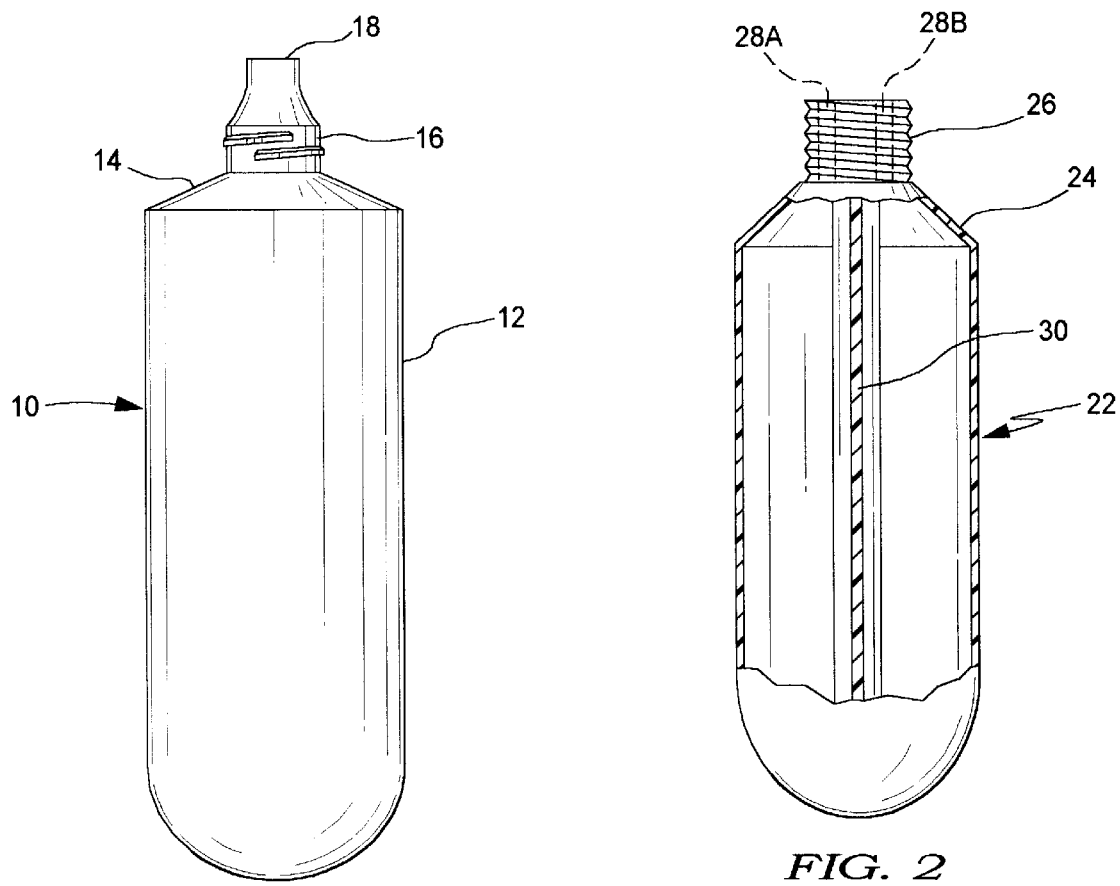
FIG. 1
FIG. 2
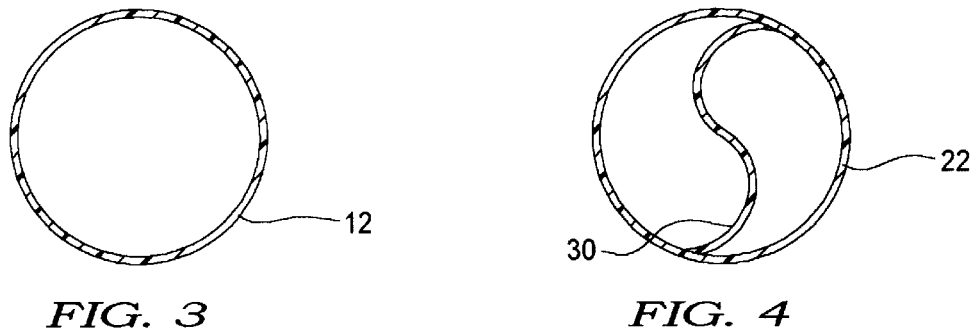
FIG. 3
FIG. 4

INJECTION STRETCH BLOW MOLDED TUBULAR CONTAINERS

FIELD OF THE INVENTION

This invention relates to the injection stretch blow molded tubular containers. In addition this invention relates to the injection stretch blow molding of thin wall tubular containers having a high strength and good barrier properties.

BACKGROUND OF THE INVENTION

Tubular containers are used for dispensing a number of different products. Tubular containers are containers that are designed not to stand on their bottom surface, are semi-rigid, and have a limited elastic deformation. These containers are designed to dispense the contained product by squeezing and are collapsible. By collapsible, it is meant that the tubular container remains deformed after the application and removal of a deforming force. There is no regaining of the original shape with the resulting suckback of air into the tubular container.

The uses for these containers include food products, oral care products and personal care products. They are particularly useful in dispensing oral care and personal care products. These products are viscous materials such as lotions, pastes or gels. The tubular containers that are presently used encompass a range of materials and a number of manufacturing techniques. These tubes comprise metallic tubes, multi-layer laminate tubes, extruded tubes and extrusion blow molded tubes. Metallic tubes usually are collapsible aluminum tubes. Multi-layer laminate tubes can be comprised solely of polymer layers or can contain paper and/or metal foil layers. A paper layer would be a print layer and a foil layer would be a barrier layer as well as a layer that produces a collapsible tube. Extruded tubes are made from a continuously extruded tube that is cut to the desired lengths. This can be of a single layer or multi-layer plastic construction.

In most laminate tubes or extruded tubes the tube body is produced separate from the tube shoulder and nozzle. The tube shoulder and nozzle is injection molded and in many instances then bonded onto the tube body. If not bonded onto the tube body it will be compression molded to the tube body. In this technique the nozzle and shoulder are formed at the same time that they are bonded onto the tube body.

Blow molded tubes presently are produced by an extrusion blow molding technique. In this technique, a material is extruded into a tubular form, placed in a mold that is the shape of the desired tube and a gas, such as air, is blown into the extrusion to form the extrusion to the shape of the mold. The tube then as taken from the mold has a fully formed shoulder and nozzle as well as sidewall. The bottom end also will be closed. The tubular container can be filled from the top opening if the opening is of a sufficient diameter. If not, the bottom end can then be severed so that the tube can be bottom filled with product. When filled from the bottom the bottom is crimp sealed and a closure attached to the other end. However, it is preferred to have a sufficiently large opening for top filing and to top fill.

In contrast to the multi-layer laminate tubes and the extruded tubes, but similar to extrusion blow molded tubes, the injection stretch blow molded tubes are manufactured in a finished form. No additional forming such as connection to a shoulder and nozzle is required. However, the blow molded tubes of this invention also are an improvement over the presently known extrusion blow molded tubes. The injection stretch blow molded tubes of this invention are also being longitudinally stretched while the tube is being blown. This produces a biaxially oriented tube structure with new and improved barrier and strength properties. This tube can be of a monolayer or multi-layer construction. It also can be comprised of a single chamber or be a multi-chamber tube. Material-wise it can be of any polymer that can be injection stretch blow molded. The tubes can have thin but yet strong walls, can readily be produced in a form where they are collapsible and have good barrier properties.

In the present invention, the tubular container can be produced in essentially any shape. The shape will be determined by the shape of the mold. Thus these can be produced in circular, elliptical or essentially any polygonal shape. In most uses they will be produced in a circular or elliptical form. Also they will be produced for top filling in order to preserve and take advantage of the enhanced strength properties of injection stretch blowmolding. If modified for bottom filling by severing a portion of the bottom of the tubular container, filling, and then crimp sealing the bottom, a weak point will be the crimp seal. This crimp seal will tend to fail prior to other parts of the tubular container. Although not preferred, it is an option to bottom fill the tubular container.

Bottles are made by injection stretch blow molding processes. This includes single and multi-chamber bottles. Polyethylene terephthalate (PET) bottles such as those used for carbonated beverages are produced by injection stretch blowmolding. These range in size from less than one liter to more than two liters. The blowmolding of multi-chamber bottles is shown in U.S. Pat. No. 5,232,108. In this patent there is shown the blow molding of a multi-chamber bottle from a multi-chamber preform with a stretch rod for each chamber. However, tubular containers have not been made by this process. Such tubular containers have been made by extrusion blow molding processes, but without stretching. Tubular containers made by these other processes do not have the same desirable barrier and strength properties, and cannot use some of the plastic materials that can be used in injection stretch blow molding processes.

The processes of the present invention solve the problems of how to produce tubular containers having improved barrier properties, increased strengths, relatively thin walls, and which are collapsible with a decreased suckback of air and product back into the tube after a dispensing.

BRIEF SUMMARY OF THE INVENTION

It has been found that collapsible, thin wall, high strength tubular containers, including multi-chamber tubular containers, can be produced using injection stretch blow molding techniques. In this process a preform is injection molded. This preform will have the same number of chambers of the final tubular container. This preform is heated to about the glass transition temperature and placed in a mold that has the desired shape of the tubular container. Stretch rods are placed into each chamber and a gas or fluid is injected as the stretch rods move downwardly to longitudinally stretch the tube preform while blowing the tube preform to laterally stretch the tube preform. The final shape of the tube will be the shape of the mold. The tubular container is formed with the shoulder and nozzle fully formed and in place. The bottom optionally can be severed from the tubular container to provide a larger opening for bottom filling the tube. However, it is preferred that there be a sufficiently large top opening for the top filling of the tubular container. This preserves the high strength properties resulting from injection stretch blowmolding.

The injection stretch blowmolded tubular containers should have a total orientation of greater than about 12, preferably greater than about 14 and most preferably greater than about 16. The wall thickness, which is the point of least thickness of the tubular container should be less than about 200 microns, preferably less than about 150 microns and most preferably less than about 125 microns. The burst strength for such a tubular container will be greater than about 7 kg/cm$^2$, preferably greater than about 8.5 kg/cm$^2$, and most preferably greater than about 10 kg/cm$^2$. This is a strength of about 3 to 5 times or more than that of other tubular containers.

The process of injection stretch blow molding has advantages over other techniques for making tubular containers, including blow molding techniques that do not incorporate a longitudinal stretching action, such as extrusion blow-molding. These include a stronger tubular container with a decreased wall thickness, better barrier properties and the ability to produce multi-chamber tubular containers at a decreased cost. The tubular containers also can be produced in a collapsible form. When in a collapsible form it will duplicate the form of the well used laminate and aluminum tubular containers.

BRIEF DESCRIPTION OF THE DRAWINGS

FIG. 1 is a side elevational view of an injection stretch blowmolded tubular container having a circular cross-section.

FIG. 2 is a side elevational view of an injection stretch blowmolded tubular container having dual chambers.

FIG. 3 is a cross-sectional view of the injection stretch blowmolded tubular container of FIG. 1.

FIG. 4 is a cross-sectional view of the injection stretch blow-molded dual chamber tubular container of FIG. 2.

DETAILED DESCRIPTION OF THE INVENTION

The present discovery is directed to the injection stretch blowmolding of tubular containers. Such tubular containers have significantly enhanced barrier properties and strength properties in comparison to extrusion blowmolded tubular containers, foil laminate tubular containers and all plastic laminate tubes. The injection stretch blowmolding process biaxially orients the plastic. This biaxial orientation step significantly increases the strength of the plastic. The burst values for a tubular container that is biaxially oriented is about 3 to 5 times or more than that of a foil laminate or an all plastic laminate tubular container.

A burst test was conducted on various tubular containers. The test is a pneumatic test or a hydrostatic test depending on the projected burst pressure. For burst pressures of up to about 4 kg/cm$^2$ a pneumatic test is used. Above this level a hydrostatic test is used. In the pneumatic test the dispensing end of the tube is securely attached to a gas injection nozzle that has an in-line tell-tale gas pressure gauge to show the highest pressure reached. A gas such as air is flowed into the tubular container until the container bursts. The maximum pressure reached then is recorded. The hydrostatic test consists of filling a tube with a liquid, such as water, and placing it in a holder which sealably grips the neck of the tube and has a conduit that by means of an incremental addition of a gas puts an increasing pressure on the liquid in the tubular container. A tell-tale pressure gauge measure the liquid pressure. Upon the tubular container failing the gauge reads the highest pressure reached. This pressure is recorded. A useful device is the Plastic Pressure Tester, Model 6159000 by AGR International, Inc. of Butler, Pa.

Various tubular containers were tested using this burst test method. Foil laminate A consists of a 90 micron low density polyethylene layer, a 37 micron polyethylene layer, a 36 micron ethylene acrylic acid adhesive layer, a 25 micron aluminum layer, a 20 micron polyethylene layer and a 70 micron low to medium density polyethylene layer. Plastic laminate B consists of 36 micron medium density polyethylene layer, a 113 micron high density polyethylene layer, a 7.5 micron adhesive layer, a 25 micron ethylene vinyl alcohol layer, a 7.5 micron adhesive layer, a 73 micron high density polyethylene layer and a 14 micron low to medium density polyethylene layer. Foil laminate A has a total thickness of 278 microns and plastic laminate B a total thickness of 276 microns. An injection stretch tube but with no blow molding consists of polyethylene terephthalate having a thickness of 126 microns. The tube wall has been stretched longitudinally but not laterally. The injection stretch blow molded tubular container contains polyethylene terephthalate at a thickness of 126 microns. Each of these tubular containers is tested in accordance with the above procedure to determine the burst strength of the tubular container. The burst strength values along with wall thickness data is given in Table 1.

TABLE 1

| Tubular Container Pressure | Burst Pressure | Wall Thickness |
| --- | --- | --- |
| Foil Laminate A[1] | 35.6 psi | 278 microns |
| Plastic Laminate B[1] | 48.0 psi | 276 microns |
| Injection Stretch[1] | 55 psi | 152.4 microns |
| Injection Stretch Blow Molded[2] | 160 psi | 126 microns |

[1]Designates a pneumatic test
[2]Designates a hydrostatic test

A key reason for the strength of the PET injection stretch blowmolded tubular containers is the degree of the total orientation of the PET material. The total orientation is the stretch in the longitudinal direction times the stretch in the lateral direction. For a material that has a significant stretch in each direction this is termed its biaxial orientation, that is, the molecules are oriented in both the axial direction (X axis) and the lateral direction (Y axis). The biaxial orientation of the molecules provides for a container of increased strength. In order to provide tubular containers with a high burst strength the total degree of orientation should be more than about 12, preferably more than about 14 and most preferably more than about 16. The net result is that a tubular container that has a wall thickness of 125 microns will have a burst strength of about 3 to 5 times or more than that of a tubular container having a wall thickness of 250 to 300 microns. This is a net savings in material used for an increase in strength. In addition since the wall thickness for an injection stretched blowmolded tubular container can be in the range of about 75 to 150 microns, the wall will be of the collapsible type rather than just being deformable. By collapsible it is meant that the tubular container will remain in a collapsed condition after the deforming force has been removed. A deformable tubular container is one that when the deforming force is removed the tubular container regains its original shape. A collapsible tubular container is preferred since after a dispensing air will not be sucked back down into the tube. Many products packaged into tubes are affected by air.

The present tubular containers will have a Strength Factor of between about 0.05 and about 0.5. The Strength Factor being calculated by the following equation:

$$\text{Strength Factor} = \frac{\text{Burst Strength (kg/cm}^2)}{\text{Wall Thickness (microns)}}$$

When the material has these strength factors it will have a high burst strength.

FIGS. 1 to 4 illustrate the physical aspects of tubular containers of this invention. These tubes can have essentially any shape. In FIG. 1 tubular container 10 has sidewalls 12, shoulder 14, and neck 16. Aperture 18 is the dispensing aperture for the tubular containers. FIG. 2 is a view of a dual chamber injection blow molded tubular container 20 in partial cutaway to show the two chambers. This tubular container has sidewalls 22, shoulder 24 and neck 26. Apertures 28(a) and 28(b) are the dispensing apertures. Chamber dividing wall 30 separates that tube into two chambers. The cross-section of the thin side wall of the tubular container of FIG. 1 is shown in FIG. 3. FIG. 4 shows in cross-section the thin wall structure of a dual chamber tubular container of FIG. 2 produced by injection stretch blowmolding.

The tubular containers of this invention are made by any of the various known injection stretch blow molding techniques. This includes forming a preform by injection molding and while heated to about the glass transition temperature of the resin placing the preform in a mold and stretching the preform axially while blowing air into the preform to stretch the preform laterally to the walls of the mold. The tubular container that is produced is stretched both longitudinally and laterally. This provides the tube with high strength and good barrier properties.

What is claimed is:

1. An injection stretch blowmolded tubular container comprising a unitary structure having a lower body portion and an upper shoulder portion, said lower body portion closed at one end and terminating at said shoulder portion at an other end, said shoulder portion terminating in an aperture, said tubular container comprised of a material that is collapsible, has a wall thickness of less than about 200 microns, a burst strength of more than about 7 kg/cm² and a Strength Factor calculated in accordance with the equation:

$$\text{Strength Factor} = \frac{\text{Burst Strength (kg/cm}^2)}{\text{Wall Thickness (microns)}}$$

of about 0.05 to about 0.5.

2. An injection stretch blowmolded tubular container as in claim 1 wherein said tubular container has a burst strength of more than about 8.5 kg/cm².

3. An injection stretch blowmolded tubular container a in claim 2 wherein said tubular container has a burst strength of more than about 10 kg/cm².

4. An injection stretch blowmolded tubular container as in claim 1 wherein said wall thickness is less than about 150 microns.

5. An injection stretch blowmolded tubular container as in claim 4 wherein said wall thickness is about 75 to 150 microns.

6. An injection stretch blowmolded tubular container as in claim 1 wherein said material has a total orientation of more than about 12.

7. An injection stretch blowmolded tubular container as in claim 6 wherein said material has a total orientation of more than about 14.

8. An injection stretch blownmolded tubular container as in claim 7 wherein said material has a total orientation of more than about 16.

9. An injection stretch blowmolded tubular container comprising a unitary structure having a lower body portion and an upper shoulder portion, said lower body portion closed at one end and terminating at said shoulder portion at an other end, said shoulder portion terminating in an aperture, said tubular container comprised of a material that is collapsible, has a total orientation of more than about 12, a wall thickness of less than about 200 microns, a burst strength of more than about 7 kg/cm² and a Strength Factor calculated in accordance with the equatron:

$$\text{Strength Factor} = \frac{\text{Burst Strength (kg/cm}^2)}{\text{Wall Thickness (microns)}}$$

of about 0.05 to about 0.5.

10. An injection stretch blowmolded tubular container as in claim 9 wherein said tubular container has a burst strength of more than about 8.5 kg/cm².

11. An injection stretch blowmolded tubular container as in claim 10 wherein said tubular container has a burst strength of more than about 10 kg/cm².

12. An injection stretch blownmolded tubular container as in claim 9 wherein said wall thickness is less than about 150 microns.

13. An injection stretch blowmolded tubular container as in claim 12 wherein said wall thickness is about 75 to 150 microns.

14. An injection stretch blowmolded tubular container as in claim 9 wherein said material has a total orientation of more than about 14.

15. An injection stretch blowmolded tubular container as in claim 14 wherein said material has a total orientation of more than about 16.

* * * * *